United States Patent
Lei et al.

(10) Patent No.: US 10,932,316 B2
(45) Date of Patent: Feb. 23, 2021

(54) METHOD FOR REESTABLISHING RRC CONNECTION, TERMINAL AND STORAGE MEDIUM

(71) Applicant: GUANGDONG OPPO MOBILE TELECOMMUNICATIONS CORP., LTD., Guangdong (CN)

(72) Inventors: Yixue Lei, Guangdong (CN); Ning Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/880,000

(22) Filed: May 21, 2020

(65) Prior Publication Data

US 2020/0288528 A1 Sep. 10, 2020

Related U.S. Application Data

(63) Continuation of application No. PCT/CN2018/102587, filed on Aug. 27, 2018.

(60) Provisional application No. 62/592,112, filed on Nov. 29, 2017.

(51) Int. Cl.
| | |
|---|---|
| *H04W 76/19* | (2018.01) |
| *H04W 76/15* | (2018.01) |
| *H04W 76/18* | (2018.01) |
| *H04W 76/30* | (2018.01) |
| *H04W 76/27* | (2018.01) |
| *H04W 80/08* | (2009.01) |

(52) U.S. Cl.
CPC ........... *H04W 76/19* (2018.02); *H04W 76/15* (2018.02); *H04W 76/18* (2018.02); *H04W 76/27* (2018.02); *H04W 76/30* (2018.02); *H04W 80/08* (2013.01)

(58) Field of Classification Search
CPC .... H04B 7/2606; H04W 36/08; H04W 76/19; H04W 84/047; H04W 92/20
See application file for complete search history.

(56) References Cited

U.S. PATENT DOCUMENTS

| | | | |
|---|---|---|---|
| 2015/0245406 A1 | 8/2015 | Johansson et al. | |
| 2020/0120750 A1* | 4/2020 | Liu | H04W 76/16 |

FOREIGN PATENT DOCUMENTS

| | | |
|---|---|---|
| CN | 106162730 A | 11/2016 |
| CN | 107046735 A | 8/2017 |
| CN | 107404738 A | 11/2017 |

(Continued)

OTHER PUBLICATIONS

International Application No. PCT/CN2018/102587, International search report, dated Nov. 29, 2018, 3 pages.

(Continued)

*Primary Examiner* — Chandrahas B Patel

(74) *Attorney, Agent, or Firm* — Perkins Coie LLP

(57) ABSTRACT

Implementations of the disclosure provides a method for reestablishing an RRC connection, a terminal and a storage medium. In the method, a terminal determines a Packet Data Convergence Protocol (PDCP) for initiating an RRC connection reestablishment procedure, based on knowledge of the PDCP supported by a first base station, the PDCP is a first PDCP or a second PDCP. The terminal initiates the RRC connection reestablishment procedure to the first base station, based on the first PDCP or the second PDCP.

18 Claims, 3 Drawing Sheets

(56) References Cited

FOREIGN PATENT DOCUMENTS

| EP | 3624530 A1 | 3/2020 |
|----|------------|--------|
| RU | 2014142969 A1 | 5/2016 |
| WO | 2013107380 A1 | 7/2013 |
| WO | 2019097331 A1 | 5/2019 |

OTHER PUBLICATIONS

R2-1713388 LTE re-establishment when using NR PDCP (TP to 36.331 and 38.331) Ericsson.
Written Opinion of International Searching Authority dated Nov. 29, 2018 of PCT/CN2018/102587 (5 pages).
RU-2020118152-notice of Allowance dated Sep. 25, 2020.
18883568.0-European search report dated Nov. 13, 2020.
R2-1713388 Ericsson LTE re-establishment when using NR PDCP (TP to 36.331 and 38.331) issued Nov. 27-Dec. 1, 2017.

* cited by examiner

METHOD FOR REESTABLISHING RRC CONNECTION, TERMINAL AND STORAGE MEDIUM

CROSS-REFERENCE TO RELATED APPLICATIONS

The application is a continuation of PCT Application No. PCT/CN2018/102587, filed on Aug. 27, 2018, which claims benefit of U.S. Provisional Application No. 62/592,112, filed on Nov. 29, 2017, the contents of which are hereby incorporated by reference in their entirety.

TECHNICAL FIELD

The disclosure relates to the field of mobile communications, and in particular to a method for reestablishing a Radio Resource Control (RRC) connection, a terminal and a computer-readable storage medium.

BACKGROUND

In a Long Term Evolution (LTE) system, Radio Resource Control (RRC) connection reestablishment is performed when there is Radio Link Failure (RLF). As illustrated in FIG. 1, when there is RLF, a User Equipment (UE) 10 can send an RRC Connection Reestablishment Request message 102 to an Evolved Universal Terrestrial Radio Access Network (EUTRAN) 12, particularly, a serving or neighboring cell. If there is context in the corresponding eNode B (eNB), the RRC connection can be reestablished. Specifically, the UE may receive an RRC Connection Reestablishment message 104 from the eNB and then transmit an RRC Connection Reestablishment Complete message 106 to the eNB to indicate complete of the RRC connection reestablishment. In this way, UE does not need to enter an idle state and then spend quite a lot signaling steps to setup the RRC connection from a Random Access Channel (RACH) procedure.

For example, if an eNB supports a network mode, i.e., LTE—New Radio (NR) Dual Connectivity (DC), it means the LTE eNB is enhanced so that it can be configured with a function of an NR gNB to work in the dual connectivity mode. In this mode, the LTE eNB provides a Primary Cell (PCell) and a serving cell as a Master Node (MN) and the NR gNB provides Secondary Cells (SCells) and serving cells as a Second Node (SN). Especially, in the DC case, although LTE RRC is used for PCell in the MN, LTE Packet Data Convergence Protocol (PDCP) may not be always used. During initial access, the UE can use the LTE PDCP to send MSG1/3 to the eNB; however, after Signal Resource Bearer 2 (SRB2) and Data Resource Bearer (DRB) are configured, NR-PDCP can be used for DRB and SRB in the MN.

When LTE PCell RRC connection needs to be reestablished e.g., due to RLF, the UE may send an RRC reestablishment request towards an eNB which supports the NR PDCP or a legacy eNB which does not support the NR PDCP. However, how to properly handle the RRC connection reestablishment procedure between the UE and the eNB is a problem which needs to be solved.

SUMMARY

In view of the above, implementations of the disclosure provide a method for reestablishing an RRC connection, a terminal and a computer readable storage medium.

At a first aspect, a method for reestablishing an RRC connection is provided, the method includes the following operations performed by a terminal: determining a Packet Data Convergence Protocol (PDCP) for initiating an RRC connection reestablishment procedure, based on whether has known the PDCP type supported by a first base station, wherein the PDCP is a first PDCP or a second PDCP; and initiating the RRC connection reestablishment procedure to the first base station, based on the first PDCP or the second PDCP. In some implementations, the first PDCP is Long Term Evolution (LTE) PDCP, and the second PDCP is New Radio (NR) PDCP.

At a second aspect, a terminal is provided. The terminal may include a determination unit and an RRC connection unit. The determination unit is configured to determine a PDCP for initiating an RRC connection reestablishment procedure, based on whether has known the PDCP type supported by a first base station, wherein the PDCP is a first PDCP or a second PDCP. The RRC connection unit is configured to initiate the RRC connection reestablishment procedure to the first base station, based on the first PDCP or the second PDCP. In some implementations, the first PDCP is LTE PDCP, and the second PDCP is NR PDCP.

At a third aspect, a computer readable storage medium is provided. The computer readable storage medium stores computer readable instructions, which, when being executed by a processor, cause the processor to perform the method according to the first aspect.

BRIEF DESCRIPTION OF DRAWINGS

In order to describe the technical solutions of the implementations of the disclosure more clearly, the drawings required to be used in the implementations of the disclosure will be simply introduced below. Obviously, the drawings described below are only some implementations of the disclosure. Other drawings may further be obtained by those skilled in the art according to these drawings without creative work.

DETAILED DESCRIPTION

In order to make the solutions of the disclosure better understood by those skilled in the art, the technical solutions in the implementations of the disclosure will be clearly and completely described below in combination with the drawings in the implementations of the disclosure. Obviously, the described implementations are not all implementations but part of implementations of the disclosure. All other implementations obtained by those of ordinary skilled in the art on the basis of the implementations in the disclosure without creative work shall fall within the scope of protection of the disclosure.

Terms "first," "second" and the like in the specification, claims and drawings of the disclosure are adopted not to describe a specific sequence but to distinguish similar objects. In addition, terms "include" and "have" and any transformation thereof are intended to cover nonexclusive inclusions. For example, a process, method, system, product or device including a series of operations or units is not limited to the operations or units which are listed, but may further include operations or units which are not listed or further include other operations or units intrinsic to the process, the method, the product or the device.

"Implementation" mentioned in the disclosure means that a specific characteristic, structure or property described in combination with the implementation may be included in at least one implementation of the disclosure. Appearance of this phrase at each position in the specification may not always mean the same implementation as well as an independent or alternative implementation mutually exclusive with the other implementations. Those skilled in the art explicitly and implicitly understand that the implementations described in the disclosure may be combined with the other implementations.

In order to better understand the features and technical contents of the implementations of the disclosure, the implementations of implementations of the disclosure will be illustrated in details in connection with the drawings. The drawings are provided merely for reference but not to limit the implementations of the disclosure.

First of all, a method for establishing a connection between a terminal and a base station, particularly, a method for reestablishing an RRC connection will be described in detail.

Figure 1:
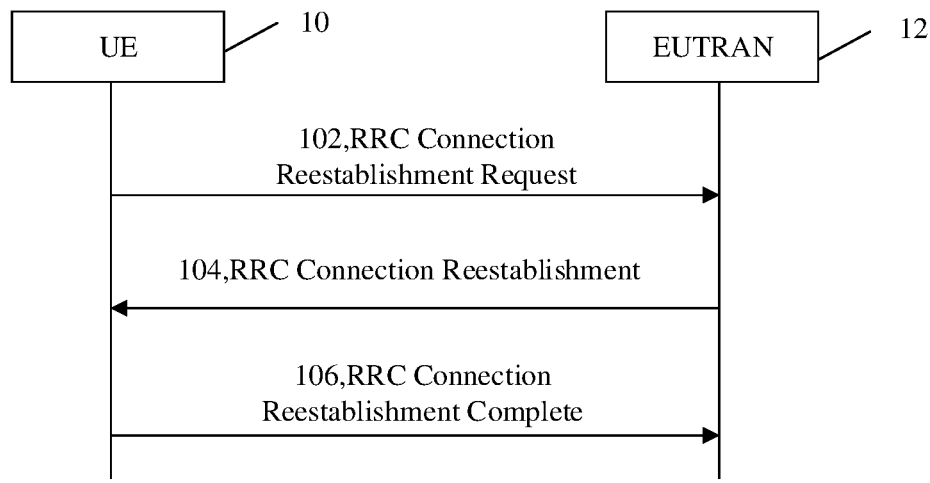
FIG. 1 illustrates a schematic view of an RRC connection reestablishment procedure.
Figure 2:
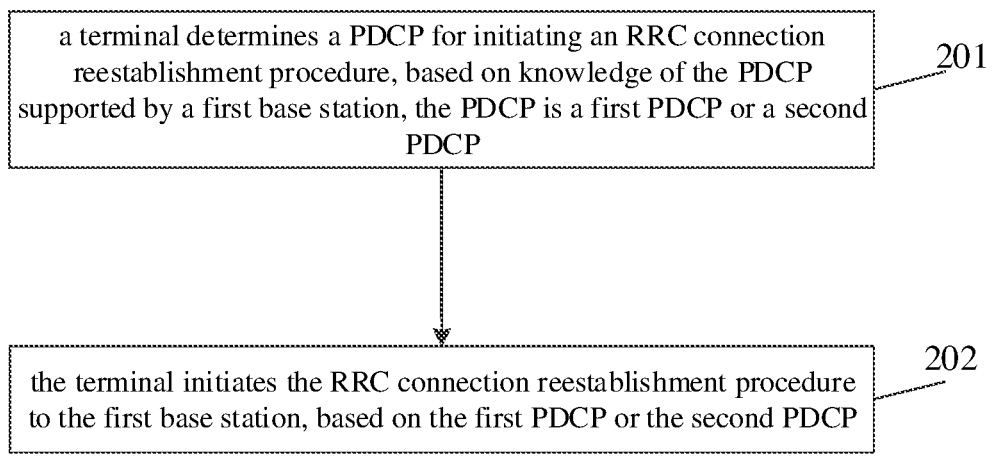
FIG. 2 illustrates a flow chart of a method for reestablishing an RRC connection according to some implementations of the disclosure.

FIG. 2 illustrates a flow chart of a method for reestablishing an RRC connection according to some implementations of the disclosure. As illustrated in FIG. 2, the method for reestablishing the RRC connection includes the following operations in blocks. The method may begin from block 201.

At block 201, a terminal determines a Packet Data Convergence Protocol (PDCP) for initiating an RRC connection reestablishment procedure, based on knowledge of (or information regarding) the PDCP supported by a first base station. The PDCP is a first PDCP or a second PDCP.

In the implementations of the disclosure, the terminal may be a mobile phone, a notebook computer, a laptop, a desktop computer or any other device that can be connected to a mobile communication network.

In the implementations of the disclosure, the first base station may be an eNode B (eNB) in the LTE system, and the corresponding DC network may be the LTE-NR Dual Connectivity (EN-DC) network; or the first base station may be a base station in another mobile communication system, for example, a gNB in the 5G NR system.

There may be several cases regarding the terminal's knowledge of (or information regarding) the PDCP supported by the first base station. For example, the terminal knows the first base station supports the first PDCP, and knows the first base station supports the second PDCP; the terminal knows the first base station supports the first PDCP, but does not know the first base station supports the second PDCP; the terminal knows the first base station supports the first PDCP, and knows the first base station does not support the second PDCP; the terminal knows the first base station supports the first PDCP, but does not know the second PDCP; and so forth. The terminal may know the PDCP supported by the first base station through previous interaction with the first base station.

In the implementations of the disclosure, if the base station supports the DC mode, the base station supports the second PDCP. For example, the first base station in the DC network is an eNB in the LTE system, and a second base station in the DC network is a gNB in the NR system, the first PDCP is LTE PDCP, and the second PDCP is NR PDCP, and if the base station supports the DC mode, the first base station supports the NR PDCP. Therefore, the method may be performed based on conditions of whether the terminal knows the first base station supports/does not support the network mode of DC. Specifically, the terminal may determine the PDCP for initiating the RRC connection reestablishment procedure, based on knowledge of (or information regarding) a network mode of Dual Connectivity (DC) supported by the first base station. Provided that the first base station supports the network mode of DC, the first base station supports the second PDCP.

In the implementations of the disclosure, there are two cases regarding whether the first base station supports the second PDCP.

Case 1: the first base station supports the second PDCP.
Case 2: the first base station does not support the second PDCP.

Here, in each of the above cases, there are the following corresponding cases at the terminal side.

In Case 1: 1) the terminal knows that the first base station supports the second PDCP; or 2) the terminal does not know that the first base station supports the second PDCP.

In Case 2: 3) the terminal knows that the first base station does not support the second PDCP; or 4) the terminal does not know that the first base station does not support the second PDCP.

For each of the above cases, according to the implementations of the disclosure, a proper PCDP may be selected to complete the RRC connection reestablishment procedure. Please see block 202 for details.

At block 202, the terminal initiates the RRC connection reestablishment procedure to the first base station, based on the first PDCP or the second PDCP.

Case 1: the first base station supports the second PDCP
1) If the terminal knows that the first base station supports the second PDCP, the terminal may transmit an RRC connection reestablishment request message to the first base station based on the second PDCP, to start the RRC connection reestablishment procedure between the terminal and the first base station based on the second PDCP. Under this circumstance, the terminal and the first base station may perform the RRC connection reestablishment procedure based on the second PDCP.

2) If the terminal does not know that that the first base station supports the second PDCP, the terminal may transmit an RRC connection reconfiguration request message based on the second PDCP, to start the RRC connection reestablishment procedure between the terminal and the first base station based on the second PDCP. Under this circumstance, the terminal and the first base station may perform the RRC connection reestablishment procedure based on the second PDCP.

3) If the terminal does not know that the first base station supports the second PDCP, the terminal may transmit an RRC connection reestablishment request message based on the first PDCP.

Here, in the case that the first base station supports both the first PDCP and the second PDCP, after the RRC connection reestablishment procedure between the terminal and the first base station based on the first PDCP is complete, the terminal and the first base station will switch from the first PDCP to the second PDCP, and perform a security mode command procedure based on the second PDCP.

However, in the case that the first base station supports the second PDCP but does not support the first PDCP, the RRC connection reestablishment procedure between the terminal and the first base station will be switched to be performed based on the second PDCP. Here, the first base station may decide to perform the RRC connection reestablishment procedure based on the second PDCP.

In some implementations, if the first base station cannot decode the RRC connection reestablishment request message transmitted by the terminal based on the first PDCP, the first base station transmits an RRC connection failure message to the terminal. If the first station can use both the first PDCP and the second PDCP to decode the RRC connection reestablishment request message transmitted by the terminal based on the first PDCP, the first base station can still correctly decode the RRC connection reestablishment request message. Under this circumstance, the first base station may transmit an RRC connection reestablishment message to the terminal.

Case 2: the first base station does not support the second PDCP

1) If the terminal knows that the first base station does not support the second PDCP or the terminal does not know that the first base station does not support the second PDCP, the terminal may transmit an RRC connection reestablishment request message to the first base station based on the first PDCP, and resume the RRC connection with the first base station by using the RRC connection reestablishment request message based on the first PDCP.

Further, the terminal may decide to release Secondary Cell Group (SCG) bearer; or the terminal may decide to keep the SCG bearer and then move the SCG bearer to the first base station.

2) If the terminal does not know that the first base station does not support the second PDCP, the terminal may transmit an RRC connection reestablishment request message to the first base station based on the second PDCP. Under this circumstance, the first base station cannot decode the RRC connection reestablishment request message transmitted by the terminal based on the second PDCP, and transmits an RRC connection failure message to the terminal. In this case, the terminal may transmit another RRC connection reestablishment request message to the first base station based on the first PDCP.

With the above schemes, the terminal and the base station, for example, eNB (either legacy eNB which does not support the NR PDCP or eNB which supports the NR PDCP) can handle the RRC connection reestablishment process properly.

Application Example 1

In application example 1, when UE sends the RRC connection reestablishment request towards an eNB supporting DC, there can be two cases:
Case 1: UE already knows the cell support DC then it sends RRC connection reestablishment with NR-PDCP, or UE does not know target cell supports DC but it sends RRC connection reconfiguration 314 with NR PDCP. The subsequent RRC connection reestablishment procedure will be using NR-PDCP and there are no issues cause by the case that UE firstly use the initial LTE PDCP and then reconfigures towards NR PDCP.

Figure 3:
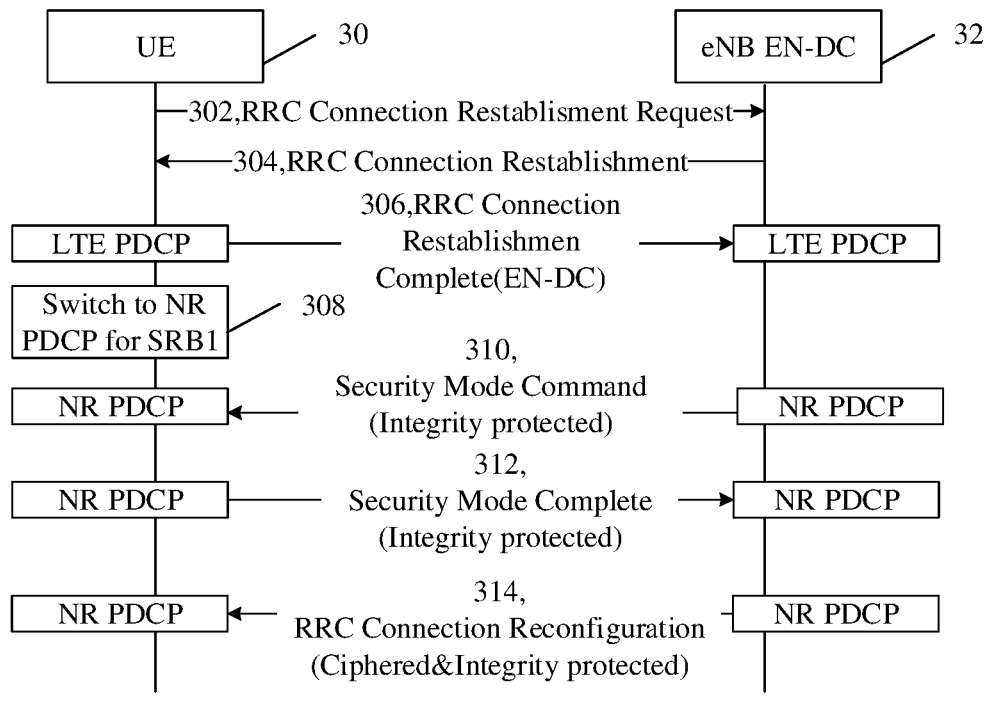
FIG. 3 illustrates a flow chart of an application example according to some implementations of the disclosure.

Case 2: UE does not know the cell support DC and it send RRC connection reestablishment with LTE PDCP. There can be two handling approaches for this case:
Handling 2a: the eNB 32 which receives the RRC connection reestablishment request supporting DC 302 can support NR-PDCP and also LTE PDCP. Thus, the procedure as illustrated in FIG. 3 is proposed. The eNB 32 replies with a RRC connection reestablishment 304. The main idea is that as long as the reestablishment is completed 306, UE 30 and eNB 32 can switch 308 to NR PDCP for SRB1, before security mode command procedure 310 and 312.
Handling 2b: the eNB which receives the reestablishment request supporting DC does not understand reestablishment request based on LTE PDCP thus reply a failure to the UE. UE then lose the chance to reestablish the RRC connection and SCG bearers will also be released. Here, it is noted that if the eNB can use both LTE PDCP and NR PDCP to decode the request message. In this case, the eNB can still correctly decode the request. But if the eNB does not decode the request using two PDCP versions, there is no such possibility.

Application Example 2

In application example 2, when UE sends the RRC connection reestablishment towards a legacy eNB which doesn't support DC, there can be two cases:
Case 3: If UE knows the target eNB doesn't support DC, or it doesn't know but occasionally send the reestablishment request with LTE PDCP, it can use reestablishment request using LTE PDCP to resume RRC connection in a target cell and also UE can decide whether to release the SCG bearer or keep the bearers and move these SCG bearer over LTE Pcell in target side.
Case 4: If UE doesn't know target cell doesn't support DC and the send the reestablishment request with NR PDCP, then the target eNB can not decode and a failure should be send to the UE. UE reestablishment fails and SCG bearer may also be released.

Figure 4:
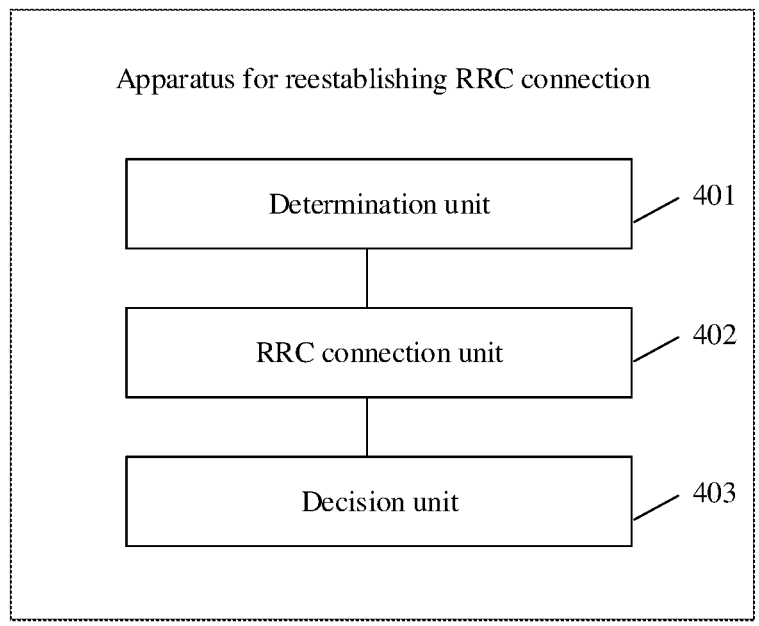
FIG. 4 illustrates a block diagram of an apparatus for reestablishing an RRC connection according to some implementations of the disclosure.

FIG. 4 illustrates a block diagram of an apparatus for reestablishing an RRC connection according to some implementations of the disclosure. For example, the apparatus for reestablishing an RRC connection may be implemented by a terminal. As illustrated in FIG. 4, the apparatus for reestablishing the RRC connection includes a determination unit 401 and an RRC connection unit 402.

The determination unit 401 is configured to determine a PDCP for initiating an RRC connection reestablishment procedure, based on knowledge of (or information regarding) the PDCP supported by a first base station, wherein the PDCP is a first PDCP or a second PDCP.

The RRC connection unit 402 is configured to initiate the RRC connection reestablishment procedure to the first base station, based on the first PDCP or the second PDCP.

In some implementations, the determination unit 401 is configured to determine the PDCP for initiating the RRC connection reestablishment procedure, based on knowledge of (or information regarding) a network mode of Dual Connectivity (DC) supported by the first base station. Provided that the first base station supports the network mode of DC, the first base station supports the second PDCP.

In some implementations, the first base station supports the second PDCP, and the RRC connection unit 402 is configured to: transmit an RRC connection reestablishment request message to the first base station based on the second PDCP, with knowing (or determining) that the first base station supports the second PDCP, to start the RRC connection reestablishment procedure between the terminal and the first base station based on the second PDCP; or transmit an RRC connection reconfiguration request message to the first base station based on the second PDCP, without knowing (or determining) that the first base station supports the second PDCP, to start the RRC connection reestablishment procedure between the terminal and the first base station based on the second PDCP.

In some implementations, the first base station supports the second PDCP, and the RRC connection unit 402 is configured to transmit an RRC connection reestablishment request message to the first base station based on the first PDCP, without knowing (or determining) that the first base station supports the second PDCP.

In some implementations, in case that the first base station supports both the first PDCP and the second PDCP, after the RRC connection reestablishment procedure between the RRC connection unit 402 and the first base station based on the first PDCP is complete, the terminal switches from the first PDCP to the second PDCP with the first base station, and performs a security mode command procedure with the first base station based on the second PDCP.

In some implementations, if the first base station cannot decode the RRC connection reestablishment request message transmitted by the terminal based on the first PDCP, the first base station transmits an RRC connection failure message to the terminal. Therefore, the RRC connection unit 402 receives RRC connection failure message from the first base station.

If the first station can use both the first PDCP and the second PDCP to decode the RRC connection reestablishment request message transmitted by the terminal based on the first PDCP, the first base station can still correctly decode the RRC connection reestablishment request message, and thus may transmit an RRC connection reestablishment message to the terminal. Therefore, the RRC connection unit 402 receives RRC connection reestablishment message from the first base station.

In some implementations, when the first base station supports the second PDCP, the first base station is a master node (MN) in the DC network.

In some implementations, the first base station does not support the second PDCP; and the RRC connection unit 402 is configured to: with or without knowing (or determining) that the first base station does not support the second PDCP, transmit the RRC connection reestablishment request message to the first base station based on the first PDCP; and resume RRC connection with the first base station, by using the RRC connection reestablishment request message based on the first PDCP.

In some implementations, the apparatus may further include a decision unit 403, configured to decide to release Secondary Cell Group (SCG) bearer; or decide to keep the SCG bearer and then move the SCG bearer to the first base station.

In some implementations, the first base station does not support the second PDCP, and the RRC connection unit 402 is configured to: without knowing (or determining) that the first base station does not support the second PDCP, transmit the RRC connection reestablishment request message to the first base station based on the second PDCP; and receive an RRC connection failure message from the first base station due to failure to decode the RRC connection reestablishment request message transmitted based on the second PDCP.

As people of ordinary skill in the art may appreciate, functions of the units in the apparatus for reestablishing an RRC connection as illustrated in FIG. 4 can be understood based on the above relevant descriptions regarding the method for reestablishing an RRC connection, and can be implemented by programs running a processor or by logical circuits. The functions of the units in the apparatus for reestablishing an RRC connection as illustrated in FIG. 4 may be implemented by programs running in a processor or by specific logical circuits.

For the apparatus for reestablishing an RRC connection as described above, when being implemented in form of software function unit and sold or used as an independent product, the function may also be stored in a computer-readable storage medium. Based on such an understanding, the technical solutions of the disclosure substantially or parts making contributions to the prior art or part of the technical solutions may be embodied in form of software product, and the computer software product is stored in a storage medium, including a plurality of instructions configured to enable a piece of computer equipment (which may be a personal computer, a server, a network device or the like) to execute all or part of the operations of the method in each implementation of the disclosure. The abovementioned storage medium includes: various media capable of storing program codes such as a U disk, a mobile hard disk, a Read-Only Memory (ROM), a Random Access Memory (RAM), a magnetic disk or an optical disk. As such, the implementations of the disclosure are not limited to any specific combination of software and hardware.

In some implementations of the disclosure, a computer readable storage medium is provided, storing instructions, which, when executed by a processor, cause the processor to execute the above described method for reestablishing an RRC connection.

Figure 5:
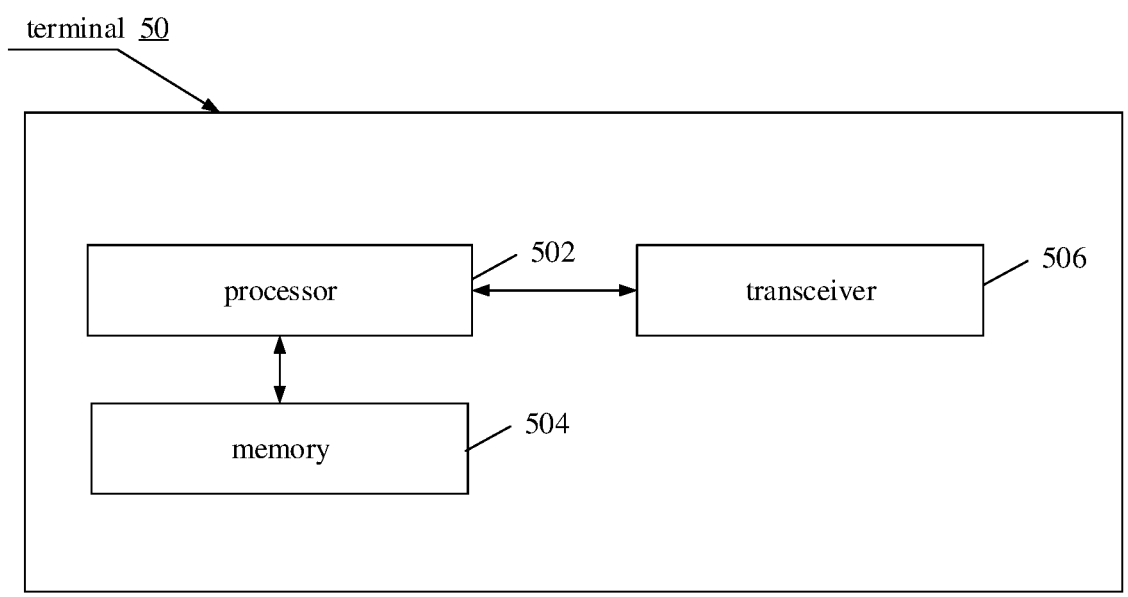
FIG. 5 illustrates a block diagram of a terminal according to some implementations of the disclosure.

FIG. 5 illustrates a block diagram of a terminal according to some implementations of the disclosure. As illustrated in FIG. 5, the terminal 50 may include one or more (only one is illustrated) processors 502 (the processor 502 may include, but is not limited to, a micro controller unit (MCU) or a programmable logic device (FPGA, Field Programmable Gate Array), etc.), a memory 504 for storing data, and a transceiver 506 for implementing a communication function. Persons of ordinary skill in the art should understand that the structure illustrated in FIG. 5 is merely illustrative, and does not limit the structure of the electronic device. For example, the terminal 50 may also include more or fewer components than illustrated in FIG. 5 or have a different configuration from that illustrated in FIG. 5.

The memory 504 may be configured to store software programs and modules, such as the program instructions/modules corresponding to the methods for reestablishing an RRC connection in the implementations of the disclosure. The processor 502 executes various functional applications and data processing by running the software programs and modules stored in the memory 504, that is, to implement the above methods. The memory 504 may include high-speed random access memory, or may include non-volatile memory such as one or more magnetic storage devices, flash memory, or other non-volatile solid-state memories. In some examples, the memory 504 may further include one or more memories remote to the processor 502, and the memories may be connected to the terminal 50 over a network. Examples of such a network include, but are not limited to, the Internet, intranets, local area networks, mobile communication networks, and combinations thereof.

The transceiver 506 is configured to receive or transmit data through a network. The network may include, for example, a wireless network provided a communication provider of the terminal 50. In an example, the transceiver 506 includes a network interface controller (NIC) which can be connected to other network devices through a base station to implement communication with the Internet. In an example, the transceiver 506 may be a radio frequency (RF) circuit which can implement communication with the Internet wirelessly.

The implementations of the disclosure may be combined with each other freely without confliction.

In the several implementations provided in the application, it shall be understood that the disclosed systems, devices and methods may be realized in other modes. For example, the implementations of the above-described devices are only exemplary, for example, the division of the units is only a logic function division, other division modes may be adopted in practice, e.g., multiple units or components may be combined or integrated in another system, or some characteristics may be omitted or be not executed. From another point of view, the displayed or discussed mutual coupling or direct coupling or communication connection may be indirect coupling or communication connection of devices or units through some interfaces, and may also be in electrical, mechanical or other forms.

The units illustrated as separate components may be or may not be physically separated, and the components displayed as units may be or may not be physical units, that is, the components may be positioned at one place or may be distributed on multiple network units. The objective of the solution of the implementations may be fulfilled by selecting part of or all of the units according to actual needs.

In addition, in various implementations of the disclosure, the functional units may be integrated in one processing unit, or the functional units may separately and physically exist, or two or more units may be integrated in one unit. The integrated units may be implemented by hardware or by hardware plus software functional units.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure.

The invention claimed is:

1. A method for reestablishing a Radio Resource Control (RRC) connection, comprising:
   determining, by a terminal, a Packet Data Convergence Protocol (PDCP) for initiating an RRC connection reestablishment procedure, based on whether the terminal knows one or more PDCP types supported by a first base station, wherein the determining of the PDCP is further based on whether Dual Connectivity (DC) is supported by the first base station, wherein the PDCP is a first PDCP or a second PDCP, wherein the first PDCP is Long Term Evolution (LTE) PDCP, and wherein the second PDCP is New Radio (NR) PDCP; and
   initiating, by the terminal, the RRC connection reestablishment procedure to the first base station,
   wherein the first base station supports the second PDCP, and
   wherein initiating the RRC connection reestablishment procedure to the first base station comprises:
      transmitting, by the terminal, an RRC connection reestablishment request message to the first base station, based on the second PDCP, to start the RRC connection reestablishment procedure between the terminal and the first base station based on the second PDCP.

2. The method according to claim 1, wherein determining the PDCP for initiating the RRC connection reestablishment procedure, based on whether has known the PDCP type supported by the first base station comprises:
   determining the PDCP for initiating the RRC connection reestablishment procedure, based on information regarding a network mode of Dual Connectivity (DC) supported by the first base station,
   wherein provided that the first base station supports the network mode of DC, the first base station supports the second PDCP.

3. The method according to claim 1, wherein the first base station is a master node in a DC network.

4. The method according to claim 1, wherein the first base station supports the second PDCP, and
   wherein initiating, by the terminal, the RRC connection reestablishment procedure to the first base station, based on the first PDCP or the second PDCP comprises:
      when the terminal does not know that the first base station supports the second PDCP, transmitting, by the terminal, an RRC connection reestablishment request message, based on the first PDCP.

5. The method according to claim 4, wherein in case that the first base station supports both the first PDCP and the second PDCP, after the RRC connection reestablishment procedure between the terminal and the first base station based on the first PDCP is complete, the method further comprises:
   switching, by the terminal, together with the first base station, from the first PDCP to the second PDCP; and
   performing, by the terminal, a security mode command procedure with the first base station based on the second PDCP.

6. The method according to claim 4, further comprising:
   receiving, by the terminal, an RRC connection failure message from the first base station due to failure to decode the RRC connection reestablishment request message transmitted by the terminal based on the first PDCP; or
   receiving, by the terminal, an RRC connection reestablishment message from the first base station that can use both the first PDCP and the second PDCP to decode the RRC connection reestablishment request message transmitted by the terminal based on the first PDCP.

7. The method according to claim 1, wherein the first base station does not support the second PDCP, and
   wherein the method further comprises: when the terminal does not know that the first base station does not support the second PDCP,
   transmitting, by the terminal, the RRC connection reestablishment request message to the first base station based on the second PDCP; and
   receiving, by the terminal, an RRC connection failure message from the first base station due to failure to decode the RRC connection reestablishment request message transmitted by the terminal based on the second PDCP.

8. The method according to claim 1, wherein the first base station does not support the second PDCP; and
   wherein initiating, by the terminal, the RRC connection reestablishment procedure to the first base station, based on the first PDCP or the second PDCP comprises:

when the terminal knows that the first base station does not support the second PDCP or when the terminal does not know that the first base station does not support the second PDCP, transmitting, by the terminal, the RRC connection reestablishment request message to the first base station based on the first PDCP; and resuming, by the terminal, RRC connection with the first base station, by using the RRC connection reestablishment request message based on the first PDCP.

9. The method according to claim 8, further comprising:
deciding, by the terminal, to release Secondary Cell Group (SCG) bearer; or
deciding, by the terminal, to keep the SCG bearer and then move the SCG bearer to the first base station.

10. A terminal, comprising:
a memory storing instructions; and
a processor communicatively coupled to the memory,
wherein the instructions, when executed by the processor, cause the processor to perform operations including:
determining a Packet Data Convergence Protocol (PDCP) for initiating an RRC connection reestablishment procedure, based on whether the terminal knows one or more PDCP types supported by a first base station, wherein the determining of the PDCP is further based on whether Dual Connectivity (DC) is supported by the first base station, wherein the PDCP is a first PDCP or a second PDCP, wherein the first PDCP is Long Term Evolution (LTE) PDCP, and wherein the second PDCP is New Radio (NR) PDCP; and
initiating the RRC connection reestablishment procedure to the first base station,
wherein the first base station supports the second PDCP, and
wherein an RRC connection unit is configured to:
transmit an RRC connection reestablishment request message to the first base station, based on the second PDCP, to start the RRC connection reestablishment procedure between the terminal and the first base station based on the second PDCP.

11. The terminal according to claim 10, wherein the first base station does not support the second PDCP, and the RRC connection unit is configured to: without determining that the first base station does not support the second PDCP,
transmit the RRC connection reestablishment request message to the first base station based on the second PDCP; and
receive an RRC connection failure message from the first base station due to failure to decode the RRC connection reestablishment request message transmitted based on the second PDCP.

12. The terminal according to claim 10, wherein operations performed by the processor further comprise:
determining the PDCP for initiating the RRC connection reestablishment procedure, based on information regarding a network mode of Dual Connectivity (DC) supported by the first base station,
wherein provided that the first base station supports the network mode of DC, the first base station supports the second PDCP.

13. The terminal according to claim 10, wherein the first base station supporting the second PDCP is a master node in a Dual Connectivity (DC) network.

14. The terminal according to claim 10, wherein the first base station supports the second PDCP, and the RRC connection unit is configured to:
transmit an RRC connection reestablishment request message to the first base station based on the first PDCP, without determining that the first base station supports the second PDCP.

15. The terminal according to claim 14, wherein in case that the first base station supports both the first PDCP and the second PDCP, after the RRC connection reestablishment procedure between the RRC connection unit and the first base station based on the first PDCP is complete, the terminal switches from the first PDCP to the second PDCP with the first base station, and perform a security mode command procedure with the first base station based on the second PDCP.

16. The terminal according to claim 14, wherein the RRC connection unit is further configured to:
receive an RRC connection failure message from the first base station due to failure to decode the RRC connection reestablishment request message transmitted based on the first PDCP; or
receive an RRC connection reestablishment message from the first base station that can use both the first PDCP and the second PDCP to decode the RRC connection reestablishment request message transmitted based on the first PDCP.

17. The terminal according to claim 10, wherein the first base station does not support the second PDCP; and the RRC connection unit is configured to: with or without determining that the first base station does not support the second PDCP,
transmit the RRC connection reestablishment request message to the first base station based on the first PDCP; and
resume RRC connection with the first base station, by using the RRC connection reestablishment request message based on the first PDCP.

18. The terminal according to claim 17, further comprising a decision unit, configured to:
decide to release Secondary Cell Group (SCG) bearer; or
decide to keep the SCG bearer and then move the SCG bearer to the first base station.

\* \* \* \* \*